US012118923B2

(12) United States Patent
Su

(10) Patent No.: US 12,118,923 B2
(45) Date of Patent: Oct. 15, 2024

(54) DRIVING CIRCUIT FOR DISPLAY PANEL

(71) Applicant: SITRONIX TECHNOLOGY CORP., Hsinchu County (TW)

(72) Inventor: Chung-Hsin Su, Hsinchu County (TW)

(73) Assignee: SITRONIX TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/091,788

(22) Filed: Dec. 30, 2022

(65) Prior Publication Data

US 2023/0401996 A1 Dec. 14, 2023

Related U.S. Application Data

(60) Provisional application No. 63/266,199, filed on Dec. 30, 2021.

(51) Int. Cl.
*G09G 3/32* (2016.01)
*G09G 3/20* (2006.01)

(52) U.S. Cl.
CPC ............. *G09G 3/32* (2013.01); *G09G 3/2092* (2013.01); *G09G 2300/0408* (2013.01);
(Continued)

(58) Field of Classification Search
CPC ................... G09G 3/32; G09G 3/2092; G09G 2300/0408; G09G 2300/0426; G09G 2300/0452; G09G 2310/0267; G09G 2310/06; G09G 2320/0204; G09G 2320/0233; G09G 2330/06; G09G 3/20; G09G 3/36
See application file for complete search history.

(56) References Cited

U.S. PATENT DOCUMENTS

2009/0109167 A1 4/2009 Park et al.
2012/0287099 A1* 11/2012 Toyotaka ................ G09G 3/20
345/79

(Continued)

FOREIGN PATENT DOCUMENTS

CN 102298903 12/2011
CN 104680984 6/2015

(Continued)

OTHER PUBLICATIONS

International preliminary report and International search report corresponding PCT patent application on Jun. 14, 2023.

(Continued)

*Primary Examiner* — Andrew Sasinowski
(74) *Attorney, Agent, or Firm* — WPAT, P.C

(57) ABSTRACT

The present application provides a driving circuit for display panel, which comprises a driving-signal generating circuit generating a driving signal in a frame time for driving a display element of a display panel. The driving signal includes at least one first turn-on pulse width, at least one first turn-off pulse width, at least one second turn-on pulse width, and at least one second turn-off pulse width. The first turn-on pulse width is greater than the second turn-on pulse width. The first turn-off pulse width is smaller than the second turn-off pulse width. By adopting the driving circuit according to the present application, EMI may be reduced and the displaying quality may be improved.

16 Claims, 8 Drawing Sheets

(52) U.S. Cl.
CPC ............... *G09G 2300/0426* (2013.01); *G09G 2300/0452* (2013.01); *G09G 2310/0267* (2013.01); *G09G 2310/06* (2013.01); *G09G 2320/0204* (2013.01); *G09G 2320/0233* (2013.01); *G09G 2330/06* (2013.01)

(56) References Cited

U.S. PATENT DOCUMENTS

| | | | | |
|---|---|---|---|---|
| 2013/0176348 | A1* | 7/2013 | Tsai | G09G 3/3614 345/209 |
| 2014/0085354 | A1* | 3/2014 | Hwang | G09G 3/342 345/691 |
| 2018/0122293 | A1 | 5/2018 | Lim et al. | |
| 2019/0371250 | A1 | 12/2019 | Baek et al. | |
| 2020/0082768 | A1 | 3/2020 | Oh et al. | |
| 2020/0098312 | A1 | 3/2020 | Cho et al. | |
| 2020/0211481 | A1 | 7/2020 | Lee et al. | |
| 2021/0065614 | A1* | 3/2021 | Kim | G09G 3/32 |

FOREIGN PATENT DOCUMENTS

| | | | |
|---|---|---|---|
| CN | 111833790 | | 10/2020 |
| CN | 113539188 | | 10/2021 |
| KR | 20160036385 | | 4/2016 |
| TW | 202016920 | A | 5/2020 |
| TW | 202142049 | A | 11/2021 |

OTHER PUBLICATIONS

Taiwan Intellectual Property Office corresponding Taiwan patent application official action search report on Jan. 3, 2024.
Taiwan Intellectual Property Office Office Action Search Report on Jun. 7, 2024.

* cited by examiner

DRIVING CIRCUIT FOR DISPLAY PANEL

FIELD OF THE INVENTION

The present application relates to a driving circuit, in particular to a driving circuit for a display panel.

BACKGROUND OF THE INVENTION

Display devices have become an indispensable part of electronic products for displaying information. They have evolved from liquid crystal displays to mini LED displays and micro LED displays. By using LEDs as display elements, the displaying quality of display devices can be enhanced. The method for driving the LEDs described above according to the prior art will induce high electromagnetic interference (EMI), which will affect the displaying quality.

Accordingly, the present application provides a driving circuit for display panel. By adopting the driving circuit, EMI may be reduced and the displaying quality may be improved.

SUMMARY OF THE INVENTION

An objective of the present application is to provide a driving circuit for display panel, which varies the frequency of the driving signal for display element in a frame time. Thereby, EMI may be reduced and the displaying quality may be improved.

The present application provides a driving circuit for display panel, which comprises a driving-signal generating circuit. The driving-signal generating circuit generates a driving signal in a frame time for driving a display element of a display panel. The driving signal includes at least one first turn-on pulse width, at least one second turn-on pulse width, and at least one third turn-on pulse width. The first turn-on pulse width is greater than the second turn-on pulse width and the third turn-on pulse width. The second turn-on pulse width is smaller than the third turn-on pulse width. In a duration within the frame time, the driving-signal generating circuit first generates the second turn-on pulse width before generating the first turn-on pulse width and the third turn-on pulse width.

The present application provides another driving circuit for display panel, which comprises a driving-signal generating circuit. The driving-signal generating circuit generates a driving signal in a frame time for driving a display element of a display panel. The driving signal includes at least one first turn-on pulse width, at least one first turn-off pulse width, at least one second turn-on pulse width, and at least one second turn-off pulse width. The first turn-on pulse width is greater than the second turn-on pulse width. The first turn-off pulse width is smaller than the second turn-off pulse width.

The present application further provides another driving circuit for display panel, which comprises a driving-signal generating circuit. The driving-signal generating circuit generates a driving signal including a plurality of first turn-on pulse widths in the (F−1) th frame time for driving a display element of a display panel, and a driving signal including a plurality of second turn-on pulse widths in the Fth frame time for driving the display element. The second turn-on pulse widths are different from the first turn-on pulse widths. The duration of the (F−1) th frame time is identical to the duration of the Fth frame time. F is an integer greater than 2.

DETAILED DESCRIPTION OF THE INVENTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising/including" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

Figure 1:
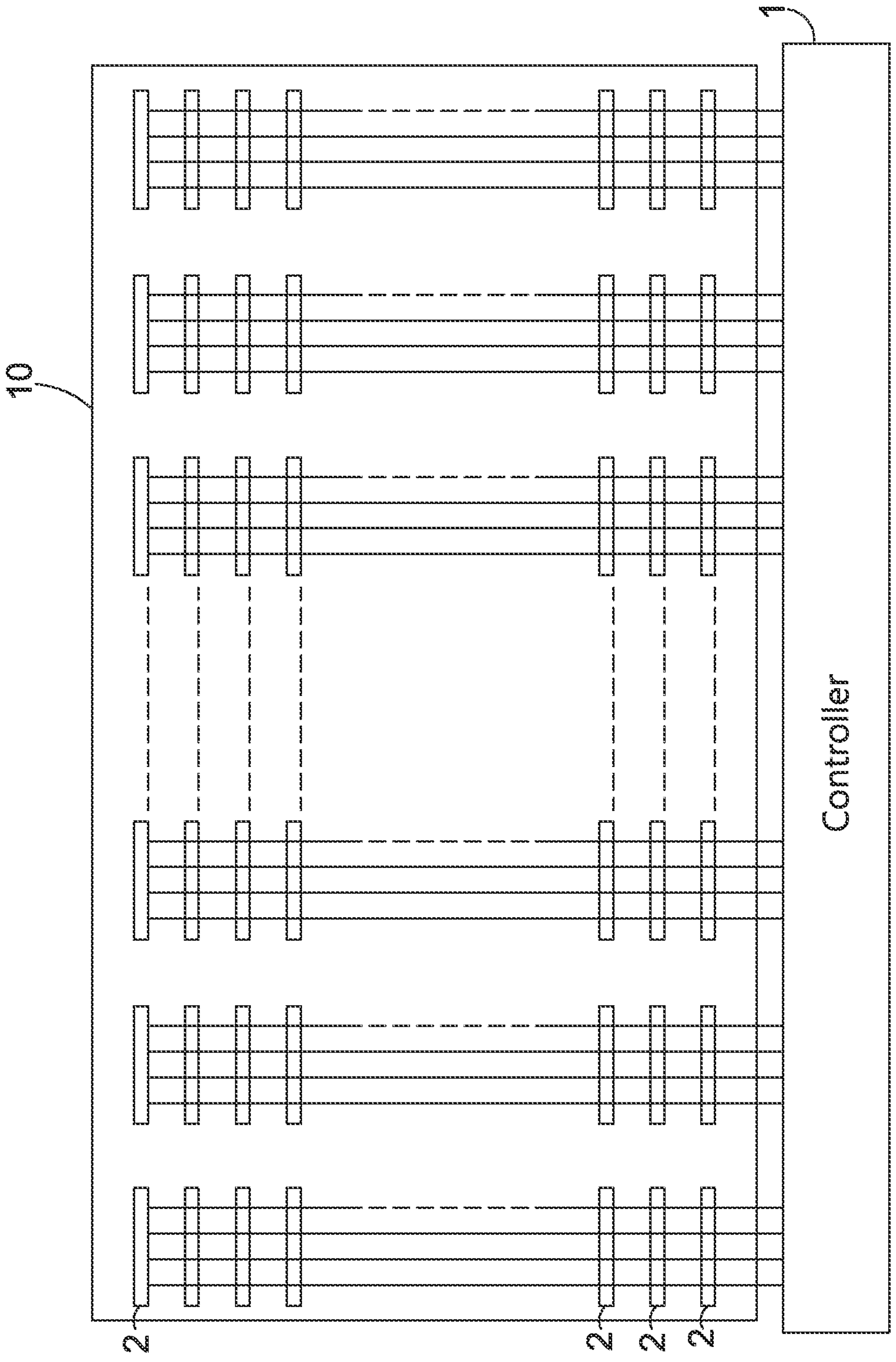
FIG. 1 shows a schematic diagram of the driving architecture according to an embodiment of the present application.
Figure 2:
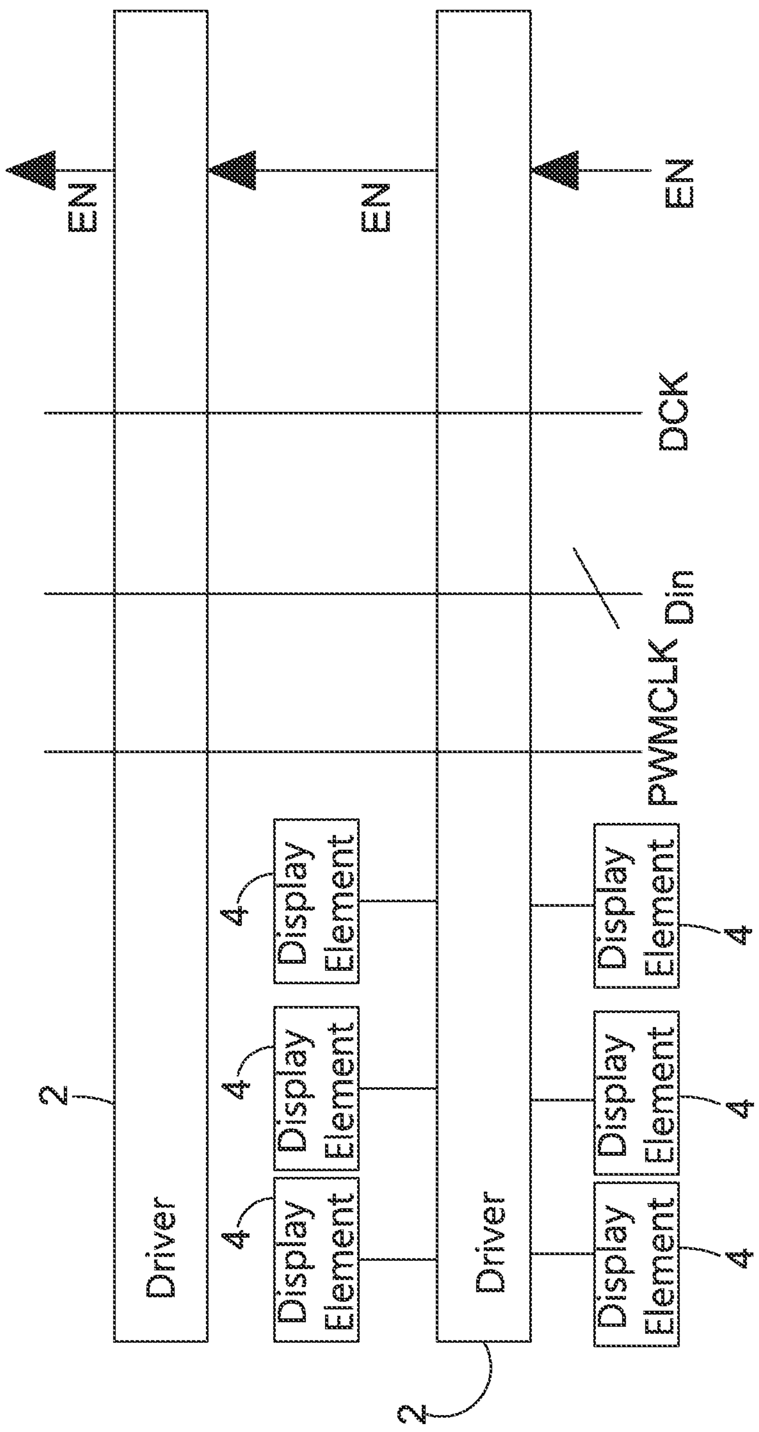
FIG. 2 shows a block diagram of the drivers and the display elements according to an embodiment of the present application.

Please refer to FIG. 1 and FIG. 2. FIG. 1 shows a schematic diagram of the driving architecture according to an embodiment of the present application; FIG. 2 shows a block diagram of the drivers and the display elements according to an embodiment of the present application. As shown in the figures, the driving architecture comprises a controller 1 and a plurality of drivers 2 for driving a plurality of pixels of a display panel 10 to display images. The drivers 2 are arranged in a plurality of rows. Each driver 2 is coupled to a plurality of display elements 4 for driving the display elements 4 to emit light. According to an embodiment of the present application, the display elements 4 may be mini LEDs or micro LEDs. The controller 1 is coupled to the drivers 2 and transmits input data Din, a timing signal DCK, a clock signal PWMCLK, and an enable signal EN to the drivers 2. According to an embodiment of the present application, the controller 1 may be an independent chip. Since the drivers 2 are arranged in rows, it may control the pixels arranged in a matrix on the display panel 10.

Figure 3:
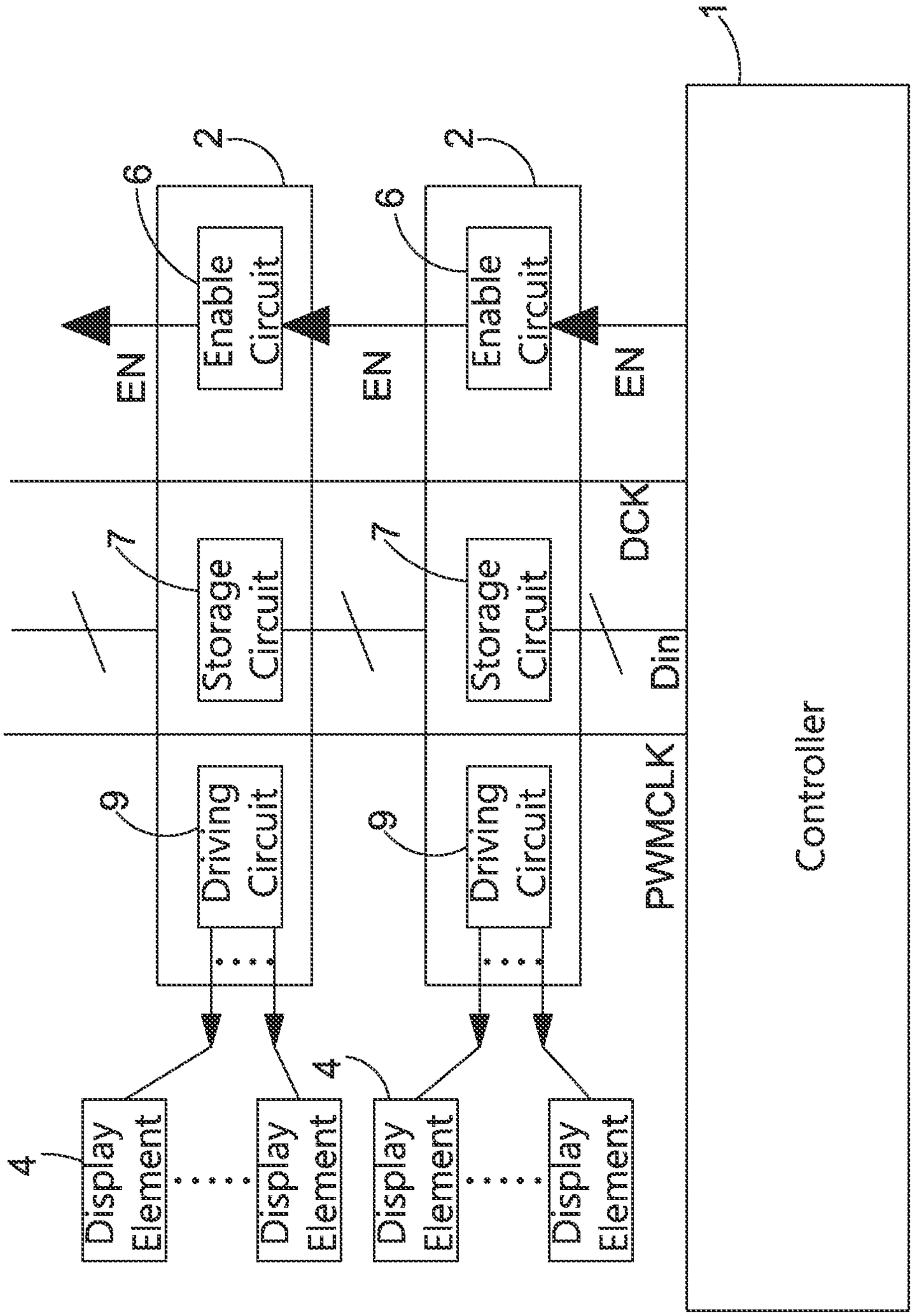
FIG. 3 shows a block diagram of the controller and the drivers according to an embodiment of the present application.

Please refer to FIG. 3, which shows a block diagram of the controller and the drivers according to an embodiment of the present application. As shown in the figure, each driver 2 includes an enable circuit 6, a storage circuit 7, and a driving circuit 9. The enable circuit 6 receives the enable signal EN and enables the storage circuit 7 according to the enable signal EN to receive the input data Din according to the timing signal DCK. The driving circuit 9 is coupled to the storage circuit 7 and the display elements 4, and generates a plurality of driving signals according to the input data Din received by the storage circuit 7 and the clock signal PWMCLK for driving the display elements 4 to generate light for displaying images. After the first driver 2 drives the display elements 4, the enable circuit 6 of the first driver 2 will disable the storage circuit 7 of the first driver 2 and transmit the enable signal EN to the enable circuit 6 of the second driver 2. By using the same operation, the second driver 2 drives the display elements 4 couple thereto, and so on.

Figure 4:
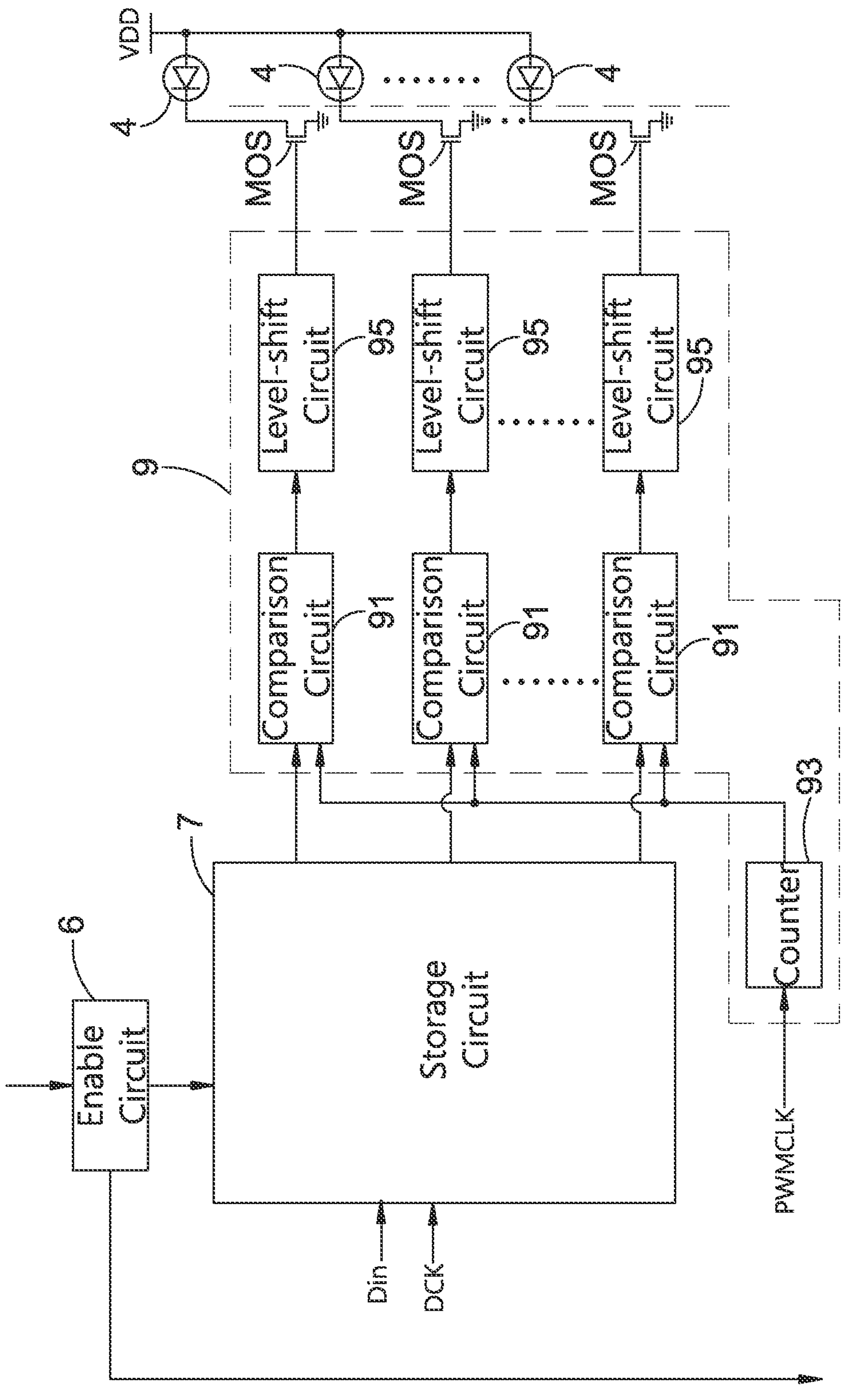
FIG. 4 shows a block diagram of the driving circuit according to an embodiment of the present application.

Please refer to FIG. 4, which shows a block diagram of the driving circuit according to an embodiment of the present application. As shown in the figure, the storage circuit 7 is coupled to the enable circuit 6 and receives the input data Din and the timing signal DCK. The enable circuit 6 enables the storage circuit 7 according to the received enable signal for driving the storage circuit 7 to receive and store the input data Din according to the timing signal DCK. The driving circuit 9 includes a driving-signal generating circuit, which includes a plurality of comparison circuits 91, a counter 93, and a plurality of level-shift circuits 95. The comparison circuits 91 are coupled to the storage circuit 7 and the counter 93. The counter 93 receives the clock signal PWM CLK, counts according to the clock signal PWM CLK, and outputs a counting signal. The counting signal varies according to the counting of the counter 93. Each comparison circuit 91 receives the counting signal and the pixel data in the input data Din stored in the storage circuit 7. It compares the counting signal with the pixel data. When the pixel data is greater than the counting signal, the comparison circuit 91 outputs the driving signal with the driving level, for example, the high voltage level. According to another embodiment of the present application, when the pixel data is smaller than the counting signal, the comparison circuit 91 outputs the driving signal with the driving level. The level-shift circuits 95 are coupled to the comparison circuits 91 and shift the levels of the driving signals output by the comparison circuits 91. According to an embodiment of the present application, the level-shift circuits 95 may be not required. One terminal of the display elements 4 are coupled to a supply voltage VDD. A switch MOS is coupled between the other terminal of the display elements 4 and the ground. The driving signals generated by the driving circuit 91 are used for controlling the switches MOS for driving currents to flow through the display elements 4 and generate light. According to the above description, the time by which the comparison circuit 91 generates the driving signal with the driving level continuously is the driving time, which is the time for driving the display element 4 and determines the brightness of the display element 4.

Figure 5:
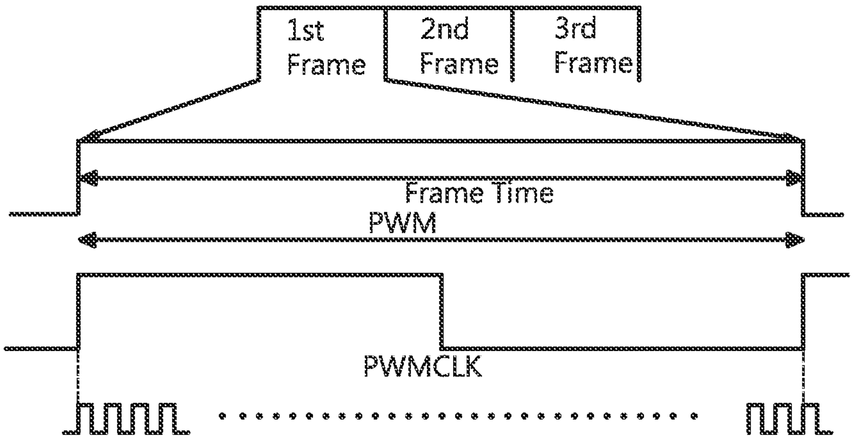
FIG. 5 shows a schematic diagram of the driving signal according to the first embodiment.

Please refer to FIG. 5, which shows a schematic diagram of the driving signal according to an embodiment. As shown in the figure, the driving signal includes a turn-on pulse width (high level) and a turn-off pulse width (low level) in a frame time. That is, the driving signal includes a pulse width modulation (PWM). The turn-on pulse width determines the time to generate light by the display element 4.

Figure 6:
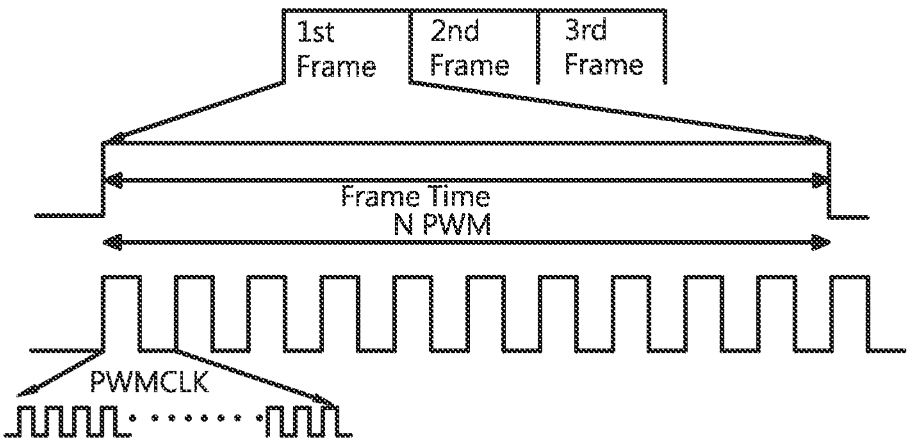
FIG. 6 shows a schematic diagram of the driving signal according to the second embodiment.

Please refer to FIG. 6, which shows a schematic diagram of the driving signal according to another embodiment. As shown in the figure, the driving signal includes a plurality of turn-on pulse widths and a plurality of turn-off pulse widths in a frame time. That is, the driving signal includes N pulse width modulations. The driving signal as shown in FIG. 6 is superior to the one shown in FIG. 5. It may reduce flicker phenomena of the display element 4. Given the same driving time of 0.1 second and the frame time of 0.2 second, the driving signal of FIG. 5 drives the display element 4 to light continuously for 0.1 second and unlight continuously for 0.1 second, which tends to generate flicker. On the contrary, the driving signal of FIG. 6 includes 10 turn-on pulse widths, meaning that 0.1 second will be divided into the 10 turn-on pulse widths and each pulse width drives the display element 4 for 0.01 second. Thereby, in a frame time, the display element 4 still light for 0.1 second with reduced flicker. Unfortunately, driving the display element 4 using identical turn-on pulse widths continuously will result in higher EMI.

Figure 7:
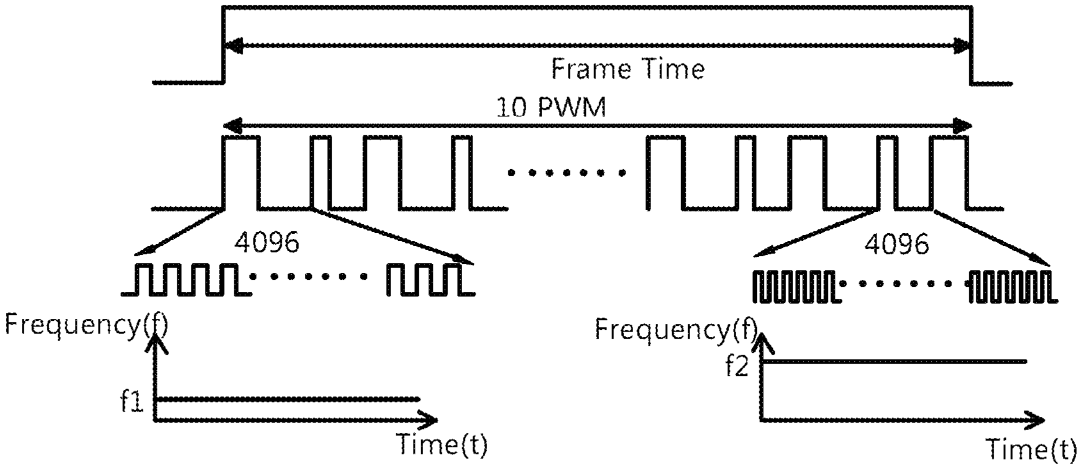
FIG. 7 shows a schematic diagram of the driving signal according to the third embodiment.

Please refer to FIG. 7, which shows a schematic diagram of the driving signal according to the third embodiment. As shown in the figure, the driving circuit 9 generates the driving signal in a frame time. The driving signal includes a plurality of first turn-on pulse widths and a plurality of turn-on second pulse widths. The first turn-on pulse width is greater than the second turn-on pulse width. It means that the frequency of the clock signal PWM CLK received by the driving circuit 9 is a first frequency f1 or a second frequency f2. The driving circuit 9 generates the first turn-on pulse width according to the clock signal PWM CLK with the first frequency f1 and generates the second turn-on pulse width according to the clock signal PWM CLK with the second frequency f2. The first frequency f1 is smaller than the second frequency f2. Since the frequency of the driving signal changes in a frame time, EMI may be reduced. The counter 91 counts a fixed number of clock pulses for generating the first turn-on pulse width and the second turn-on pulse width. For example, the counter 91 recounts when the counter 91 counts 4096 pulses of the clock signal PWM CLK, which means the maximum value of the counting signal is 4096.

Figure 8:
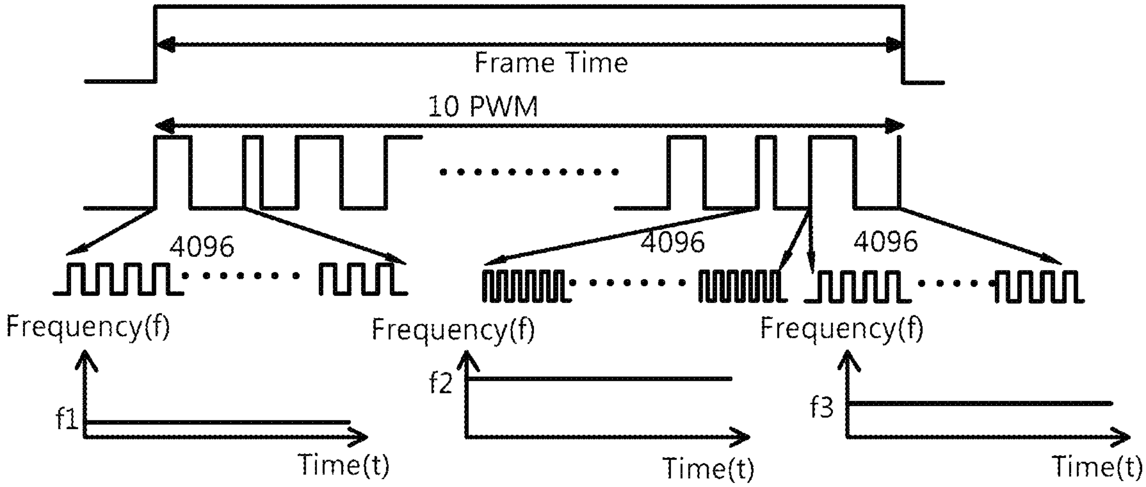
FIG. 8 shows a schematic diagram of the driving signal according to the fourth embodiment.

Please refer to FIG. 8, which shows a schematic diagram of the driving signal according to the fourth embodiment. As shown in the figure, the driving circuit 9 generates the driving signal in a frame time. The driving signal includes a plurality of first turn-on pulse widths, a plurality of second turn-on pulse widths, and a plurality of third turn-on pulse widths. The first turn-on pulse width is greater than the second turn-on pulse width and the third turn-on pulse width. The second turn-on pulse width is smaller than the third turn-on pulse width. It means that the frequency of the clock signal PWM CLK received by the driving circuit 9 is the first frequency f1, the second frequency f2, or a third frequency f3. The driving circuit 9 generates the first turn-on pulse width according to the clock signal PWM CLK with the first frequency f1, the second turn-on pulse width according to the clock signal PWM CLK with the second frequency f2, and the third turn-on pulse width according to the clock signal PWM CLK with the third frequency f3. The first frequency f1 is smaller than the second frequency f2 and the third frequency f3. The third frequency f3 is smaller than the second frequency f2. According to an embodiment of the present application, in a duration within the frame time, the second turn-on pulse width is generated before the first turn-on pulse width or the third turn-on pulse width. In other words, the second turn-on pulse width is first generated according to the second frequency f2. Then the first turn-on pulse width or the third turn-on pulse width is generated according to the first frequency f1 or the third frequency f3. The counter 91 counts the fixed number of clock pulses for generating the first, second, third turn-on pulse widths.

According to an embodiment of the present application, beyond a duration within the frame time, the driving-signal generating circuit generates N first turn-on pulse widths of the plurality of first turn-on pulse widths, P second turn-on pulse widths of the plurality of second turn-on pulse widths, and Q third turn-on pulse widths of the plurality of third turn-on pulse widths sequentially. N, P, Q are positive integers. That is to say, the first, second, or third turn-on pulse widths may be generated continuously. Alternatively, the driving-signal generating circuit generates Q third turn-on pulse widths of the plurality of third turn-on pulse widths, P second turn-on pulse widths of the plurality of second turn-on pulse widths, and N first turn-on pulse widths of the plurality of first turn-on pulse widths sequentially.

The driving circuit 9 according to the present application generates the driving signal in a plurality of frame times with identical durations. The driving signal includes at least one of the first, second, and third turn-on pulse widths. Namely, the driving signal is generated in the (F−1) th frame time, the Fth frame time, and the (F+1) th frame time. The driving signal includes one of the first turn-on pulse width, the second turn-on pulse width, and the third turn-on pulse width. The durations of the (F−1) th frame time, the Fth frame time, and the (F+1) th frame time are identical. F is an integer greater than 2.

Figure 9:
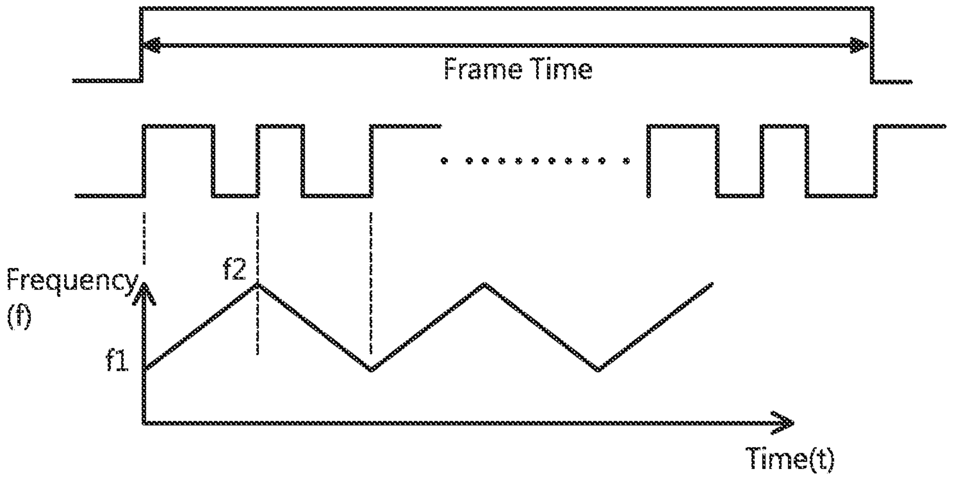
FIG. 9 shows a schematic diagram of the driving signal according to the fifth embodiment.

Please refer to FIG. 9, which shows a schematic diagram of the driving signal according to the fifth embodiment. As shown in the figure, in a frame time with a plurality of pulse width modulation periods (PWM periods), the frequency of the clock signal PWM CLK increases from the first frequency f1 to the second frequency f2 continuously (in the odd PWM periods, in this embodiment), and then reduces from the second frequency f2 to the first frequency f1 continuously (in the even PWM periods, in this embodiment). In the duration when the frequency of the clock signal PWM CLK changes from the first frequency f1 to the second frequency f2, the driving circuit 9 generates the first turn-on pulse width and the first turn-off pulse width according to the clock signal PWM CLK. In the duration, when the frequency of the clock signal PWM CLK changes from the second frequency f2 to the first frequency f1, the driving circuit 9 generates the second turn-on pulse width and the second turn-off pulse width according to the clock signal PWM CLK. The first turn-on pulse width is greater than the second turn-on pulse width; the first turn-off pulse width is smaller than the second turn-off pulse width; the first turn-on pulse width may be is equal to the second turn-off pulse width; the second turn-on pulse width may be is equal to the first turn-off pulse width. The counter 91 counts the fixed number of clock pulses for generating the first turn-on pulse width, the first turn-off pulse width, the second turn-on pulse width, and the second turn-off pulse width.

Figure 10:
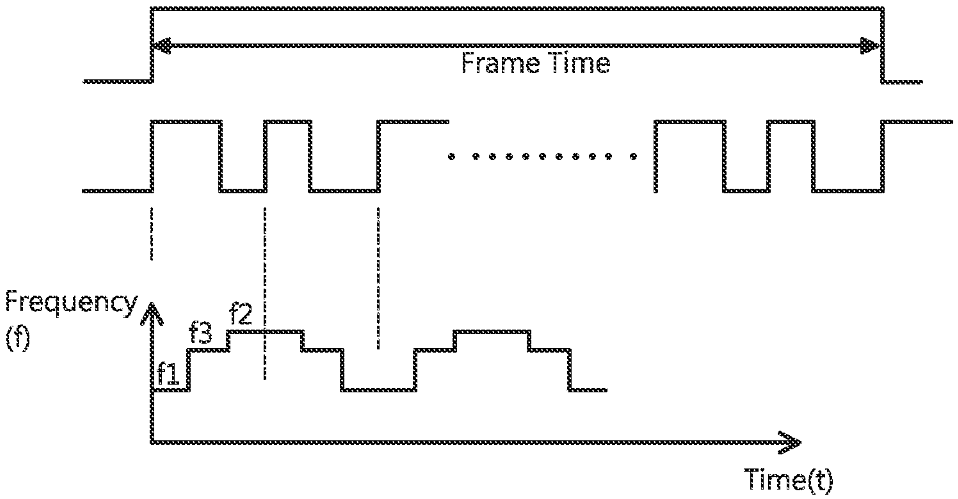
FIG. 10 shows a schematic diagram of the driving signal according to the sixth embodiment.

Please refer to FIG. 10, which shows a schematic diagram of the driving signal according to the sixth embodiment. As shown in the figure, in a frame time with a plurality of PWM periods, the frequency of the clock signal PWM CLK timely and directly changes from the first frequency f1 to the third frequency f3 and then to the second frequency f2 (in the odd PWM periods, in this embodiment). Then it timely and directly changes from the second frequency f2 to the third frequency f3 and then to the first frequency f1 (in the even PWM periods, in this embodiment). Thereby, the driving circuit 9 may generate driving signal with varying pulse widths. The driving signal is similar to the one in the embodiment of FIG. 9.

Figure 11:
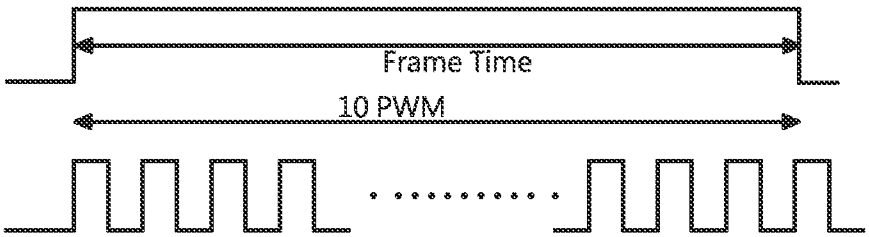
FIG. 11 to FIG. 13 show the schematic diagrams of the driving signals according to the seventh to the ninth embodiments.
Figure 12:
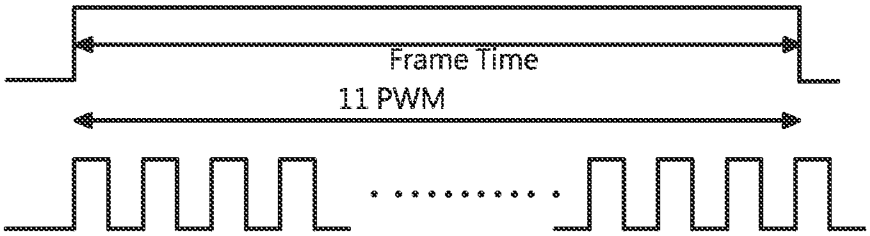
Figure 13:
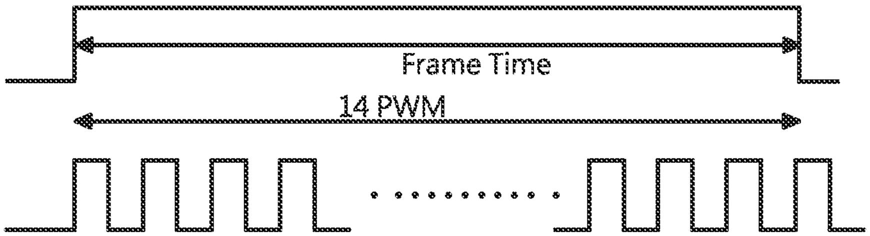

Please refer to FIG. 11 to FIG. 13. The driving circuit 9 according to the present application generates the driving signal in a plurality of frame times with identical durations for driving the same display element. The driving signal generated in each frame time has identical turn-on and turn-off pulse widths. Nonetheless, the turn-on and turn-off pulse widths in different frame times are different, meaning that the driving circuit 9 generates the driving signal in different frame times according to the clock signal PWM CLK with three different frequencies. For example, FIG. 11 shows the driving circuit 9 generating the driving signal with the first turn-on pulse width and the first turn-off pulse width in the (F−1) th frame time; FIG. 12 shows the driving circuit 9 generating the driving signal with the third turn-on pulse width and the third turn-off pulse width in the Fth frame time; and FIG. 13 shows the driving circuit 9 generating the driving signal with the third second turn-on pulse width and the second turn-off pulse width in the (F+1) th frame time. The durations of the (F−1) th, the Fth, and the (F+1) th frame times are identical. F is an integer greater than 2. The counter 91 counts the fixed number of clock pulses for generating the first turn-on pulse width, the second turn-on pulse width, and the third turn-on pulse width.

Accordingly, the present application conforms to the legal requirements owing to its novelty, nonobviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A driving circuit for a display panel, comprising:

a driving-signal generating circuit, generating a driving signal in a frame time to drive a display element of said display panel, said driving signal including at least one first turn-on pulse width, at least one second turn-on pulse width, and at least one third turn-on pulse width, said first turn-on pulse width greater than said second turn-on pulse width and said third turn-on pulse width, said second turn-on pulse width smaller than said third turn-on pulse width;

wherein said driving-signal generating circuit generates said driving signal according to a clock signal with a plurality of clock pulses; the frequency of said clock signal is a first frequency, a second frequency, or a third frequency; said driving-signal generating circuit generates said first turn-on pulse width according to said clock signal with said first frequency, said second turn-on pulse width according to said clock signal with said second frequency, and said third turn-on pulse width according to said clock signal with said third frequency.

2. The driving circuit of claim 1, wherein in a duration within said frame time, said driving-signal generating circuit first generates said second turn-on pulse width, then said first turn-on pulse width, and then said third turn-on pulse width.

3. The driving circuit of claim 1, wherein in a duration within said frame time, said driving-signal generating circuit first generates said second turn-on pulse width, then said third turn-on pulse width, and then said first turn-on pulse width.

4. The driving circuit of claim 1, wherein said driving-signal generating circuit generates said first turn-on pulse width, said second turn-on pulse width, and said third turn-on pulse width according to a fixed number of clock pulses.

5. The driving circuit of claim 1, wherein in a duration within said frame time, said driving-signal generating circuit first generates said second turn-on pulse width before generating said first turn-on pulse width or said third turn-on pulse width.

6. The driving circuit of claim 5, wherein said at least one first turn-on pulse width includes a plurality of first turn-on pulse widths; said at least one second turn-on pulse width includes a plurality of second turn-on pulse widths; said at least one third turn-on pulse width includes a plurality of third turn-on pulse widths; beyond said duration within said frame time, said driving-signal generating circuit generates N first turn-on pulse widths of said plurality of first turn-on pulse widths, P second turn-on pulse widths of said plurality of second turn-on pulse widths, and Q third turn-on pulse widths of said plurality of third turn-on pulse widths sequentially; and N, P, Q are positive integers.

7. The driving circuit of claim 5, wherein said at least one first turn-on pulse width includes a plurality of first turn-on pulse widths; said at least one second turn-on pulse width includes a plurality of second turn-on pulse widths; said at least one third turn-on pulse width includes a plurality of third turn-on pulse widths; beyond said duration within said frame time, said driving-signal generating circuit generates Q third turn-on pulse widths of said plurality of third turn-on pulse widths, P second turn-on pulse widths of said plurality of second turn-on pulse widths, and N first turn-on pulse widths of said plurality of first turn-on pulse widths sequentially; and N, P, Q are positive integers.

8. The driving circuit of claim 1, wherein said frame time is the Fth frame time; said driving-signal generating circuit generates said driving signal in the (F−1) th frame time and the (F+1) th frame time; said driving signal includes at least one of said first turn-on pulse width, said second turn-on pulse width, and third turn-on pulse width; the durations of said (F−1) th frame time, said Fth frame time, and said (F+1) th frame time are identical; and F is an integer greater than 2.

9. A driving circuit for a display panel, comprising:

a driving-signal generating circuit, generating a driving signal in a frame time for driving a display element of said display pane, said driving signal including at least one first turn-on pulse width, at least one first turn-off pulse width, at least one second turn-on pulse width, and at least one second turn-off pulse width, said first turn-on pulse width greater than said second turn-on pulse width, and said first turn-off pulse width smaller than said second turn-off pulse width.

10. The driving circuit of claim 9, wherein said first turn-on pulse width is equal to said second turn-off pulse width; and said second turn-on pulse width is equal to said first turn-off pulse width.

11. The driving circuit of claim 9, wherein said driving-signal generating circuit generates said first turn-on pulse width and said second turn-on pulse width according to a fixed number of clock pulses.

12. The driving circuit of claim 11, wherein said driving-signal generating circuit generates said driving signal according to a clock signal with a said clock pulses; the frequency of said clock signal changes from a first frequency to a second frequency gradually, and then from said second frequency to said first frequency gradually; said second frequency is greater than said first frequency; in the duration when the frequency of said clock signal changes from said first frequency to said second frequency, said driving-signal generating circuit generates said first turn-on pulse width and said first turn-off pulse width according to said clock signal; in the duration when the frequency of said clock signal changes from said second frequency to said first frequency, said driving-signal generating circuit generates said second turn-on pulse width and said second turn-off pulse width according to said clock signal.

13. A driving circuit for a display panel, comprising:

a driving-signal generating circuit, generating a driving signal including a plurality of first turn-on pulse widths in the (F−1) th frame time for driving a display element of said display panel and a driving signal including a plurality of second turn-on pulse widths in the Fth frame time for driving said display element;

wherein said second turn-on pulse widths are different from said first turn-on pulse widths; the duration of the (F−1) th frame time is identical to the duration of the Fth frame time; and F is an integer greater than 2.

14. The driving circuit of claim 13, wherein said driving-signal generating circuit generates said driving signal including a plurality of third turn-on pulse widths in the (F+1) th frame time for driving said display element; said third turn-on pulse widths are different from said first turn-on pulse widths and said second turn-on pulse widths; the duration of the (F−1) th frame time, the duration of the Fth frame time, and the duration of the (F+1) th frame time are identical.

15. The driving circuit of claim 14, wherein said driving-signal generating circuit generates said first turn-on pulse widths, said second turn-on pulse widths, and said third turn-on pulse widths according to a fixed number of clock pulses.

16. The driving circuit of claim 15, wherein said driving-signal generating circuit generates said driving signal according to a clock signal with said clock pulses; the frequency of said clock signal is a first frequency, a second frequency, or a third frequency; said driving-signal generating circuit generates said first turn-on pulse widths according to said clock signal with said first frequency, said second turn-on pulse widths according to said clock signal with said second frequency, and said third turn-on pulse widths according to said clock signal with said third frequency.

* * * * *